(12) United States Patent
Barbier et al.

(10) Patent No.: US 9,919,625 B1
(45) Date of Patent: Mar. 20, 2018

(54) CONVERTIBLE SEATING SYSTEM WITH FLIP-OUT WORK SURFACE FOR MARINE VESSELS

(71) Applicant: Brunswick Corporation, Lake Forest, IL (US)

(72) Inventors: John E. Barbier, Port Orange, FL (US); John O. Wizorek, Port Orange, FL (US)

(73) Assignee: Brunswick Corporation, Mettawa, IL (US)

( * ) Notice: Subject to any disclaimer, the term of this patent is extended or adjusted under 35 U.S.C. 154(b) by 42 days.

(21) Appl. No.: 15/098,455

(22) Filed: Apr. 14, 2016

(51) Int. Cl.
  *A47C 7/00* (2006.01)
  *B60N 2/20* (2006.01)
  *B63B 29/04* (2006.01)

(52) U.S. Cl.
  CPC .............. *B60N 2/206* (2013.01); *B63B 29/04* (2013.01); *B63B 2029/043* (2013.01)

(58) Field of Classification Search
  CPC ............................ A47B 85/04; A47D 11/002
  USPC ....... 297/283.1, 283.2, 283.3, 118, 119, 122, 297/124, 129, 128
  See application file for complete search history.

(56) References Cited

U.S. PATENT DOCUMENTS

| | | | | |
|---|---|---|---|---|
| 427,413 A * | 5/1890 | Fritz | ....................... | A47C 13/00 297/126 |
| 1,271,830 A * | 7/1918 | Austin | ................... | A47B 85/04 297/128 |
| 1,792,737 A * | 2/1931 | Greenstreet | ............ | A47B 83/02 297/121 |
| 2,113,346 A | 4/1938 | Heath | | |
| 2,486,468 A * | 11/1949 | Freedman | ................. | A47B 3/14 297/124 |
| 2,900,009 A * | 8/1959 | Haynes | ................... | A47B 85/06 297/126 |
| 3,482,870 A * | 12/1969 | Janssen | ..................... | A47C 3/00 297/118 |
| 3,506,303 A * | 4/1970 | Smittle | ................... | B60N 3/002 297/162 |
| 3,877,747 A * | 4/1975 | Brennan | ................... | A47C 7/70 244/122 R |
| 4,536,027 A * | 8/1985 | Brennan | ................... | A47C 7/70 244/122 R |
| 5,052,748 A * | 10/1991 | Fourrey | ................... | B60N 2/20 297/124 |
| 5,374,108 A * | 12/1994 | Saul | ....................... | A47C 17/04 297/113 |
| 7,647,880 B2 | 1/2010 | Devine | | |
| 7,699,390 B2 * | 4/2010 | Baumann | ............... | B64D 11/06 297/124 |
| 7,819,483 B2 | 10/2010 | Kushner et al. | | |
| 8,002,350 B2 * | 8/2011 | Johnson | ................. | B60N 3/004 297/124 |

(Continued)

*Primary Examiner* — Jose V Chen
(74) *Attorney, Agent, or Firm* — Andrus Intellectual Property Law, LLP

(57) ABSTRACT

A seating system includes a base, and a seat mounted on the base and defining a seating surface. A backrest is configured for movement relative to the base and the seat between a first position and a second position by a backrest transfer arrangement having a movable pivot axis configuration. In the second position, the backrest defines a working surface spaced above and lying generally parallel to the seating surface.

18 Claims, 8 Drawing Sheets

(56) References Cited

U.S. PATENT DOCUMENTS

| | | | |
|---|---|---|---|
| 8,113,589 B2* | 2/2012 | Mildt | B60N 2/20 |
| | | | 297/124 |
| 8,840,175 B2* | 9/2014 | Short | A47B 85/04 |
| | | | 297/119 |
| 9,021,975 B1 | 5/2015 | Fodor et al. | |
| 9,073,608 B1 | 7/2015 | Foss et al. | |
| 2006/0103174 A1* | 5/2006 | Queveau | B60N 2/3011 |
| | | | 297/15 |
| 2011/0057483 A1* | 3/2011 | Dickey | A47B 3/14 |
| | | | 297/124 |

* cited by examiner

… (US 9,919,625 B1)

CONVERTIBLE SEATING SYSTEM WITH FLIP-OUT WORK SURFACE FOR MARINE VESSELS

FIELD

The present disclosure relates to marine vessels and watercraft, and more particularly, pertains to a convertible seating system provided with a flip-out working surface for marine vessels and watercraft.

BACKGROUND

U.S. Pat. No. 9,073,608, which is herein incorporated by reference in entirety, discloses a convertible seating system for watercraft having a base supporting a seating surface and a backrest pivotably attached to the base. The backrest pivots about the seating surface to provide a plurality of selectable seating positions. The backrest is pivotably attached to the base by an arm attached to the side of the backrest. The arm engages a guide member attached to the base, the guide member having one or more positional slots corresponding to the plurality of selectable seating positions. The backrest can be positioned upright, at an angle, or flat with respect to the seating surface to provide a plurality of seating configurations including simultaneous forward and aft seats, an aft-facing lounge seat and a sunpad. The seating surface comprises hingeable seat cushions that permit access to storage compartments inside the base. The seating system can be installed adjacent to a bulkhead on a watercraft to provide an aft-facing lounge seat.

U.S. Pat. No. 9,021,975, which is herein incorporated by reference in entirety, discloses a convertible seating system for marine vessels and watercraft including a chair having a backrest, a seat bottom and a lounge extension element. A first end of the extension element is hingeably attached to and extends from the seat bottom and a second end of the extension element is configured to be hingeably attached to a first rigid structure, such as a bulkhead on a watercraft. The seating system is convertible between a forward-facing seat configuration and an aft-facing lounger configuration. In the aft-facing lounger configuration, the extension element and the seat bottom are substantially parallel to one another. In the forward-facing seat configuration, the extension element is substantially upright and at an acute angle with respect to the seat bottom.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one example of the present disclosure, a seating system includes a base and a seat mounted on the base and defining a seating surface. A backrest is configured for movement relative to the base and the seat between a first position and a second position by a backrest transfer arrangement having a movable pivoting axis configuration. In the second position, the backrest defines a working surface spaced above and lying generally parallel to the seating surface.

According to another example of the present disclosure, a seating system includes a seat defining a seating surface, and a base mounting the seat thereon and having a raised support structure extending above the seat. A backrest is mounted to the raised support structure on the base for movement relative to the seat between a raised position and a horizontal position extending above the seat and defining a work surface lying parallel to the seating surface. The backrest is adjustably connected to the raised support structure by a backrest transfer arrangement including a pair of transfer assemblies mounted between opposed side members of the backrest and opposed sidewalls of the raised support structure. Each of the transfer assemblies is provided with a movable pivot axis configuration.

According to a further example of the present disclosure, a seating system includes a base having a front end, a rear end and opposed side members. A seat is mounted on the base and defines a seating surface. A backrest is movably attached to the base by a pair of transfer assemblies enabling movement of the backrest between a raised position and a horizontal position. In the horizontal position, the backrest defines a working surface which is spaced above and lies generally parallel to the seating surface. Each of the transfer assemblies includes a mounting plate fixed to one of the side members of the base, a bent link having one end pivotally connected about a first pivot axis to a side portion of the backrest, and an opposite end pivotally connected at a second pivot axis to the mounting plate. A straight link has one end pivotally connected about a third pivot axis to the side portion of the backrest, and an opposite end is pivotally secured about a fourth pivot axis to the mounting plate. The first pivot axis and the second pivot axis are movable relative to the base and the seat.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed.

Figure 1:
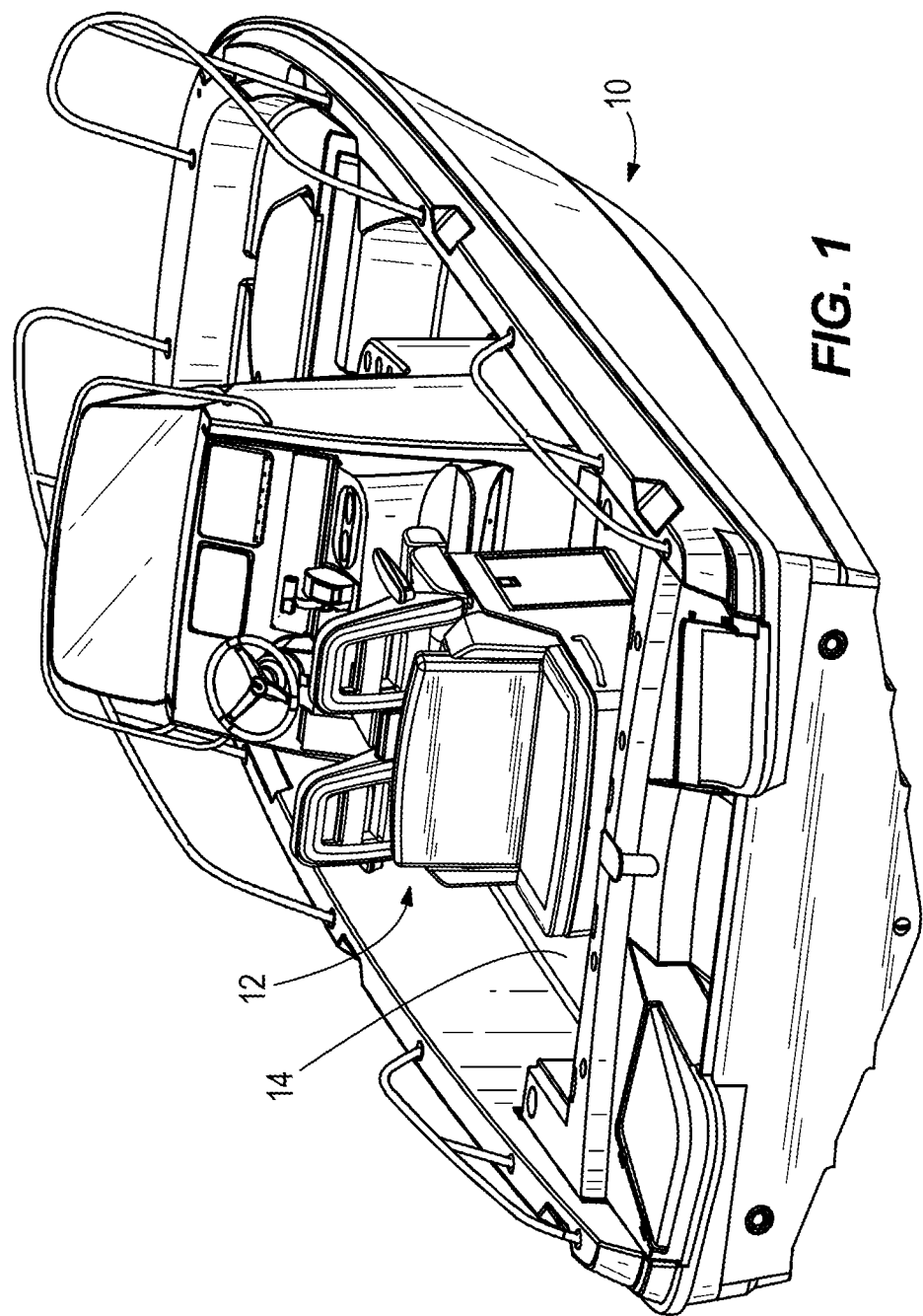
FIG. 1 is a perspective view of a boat provided with a convertible seating system providing a flip-out work surface in accordance with the present disclosure.

FIG. 1 illustrates a boat 10 equipped with a seating system 12 defining a convertible seating arrangement in accordance with an exemplary preferred embodiment of the present disclosure. The seating system 12 is designed to be installed on a deck 14 of the boat 10, and is configured to provide sitting and working surfaces as will be further described below.

The seating system 12 is generally comprised of a base 16, a seat 18 and an adjustable backrest 20.

Figure 2:
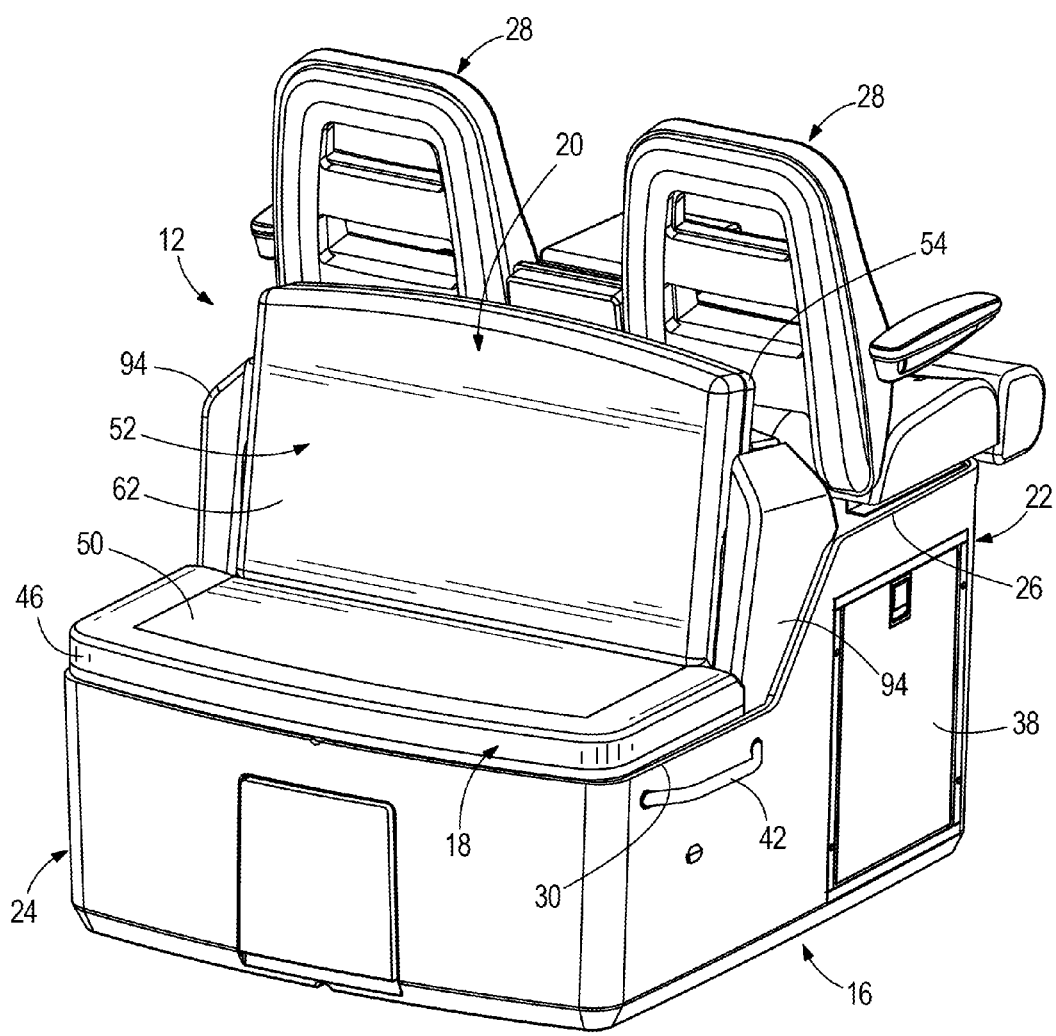
FIG. 2 is a rear perspective view of the convertible seating system shown in FIG. 1.
Figure 3:
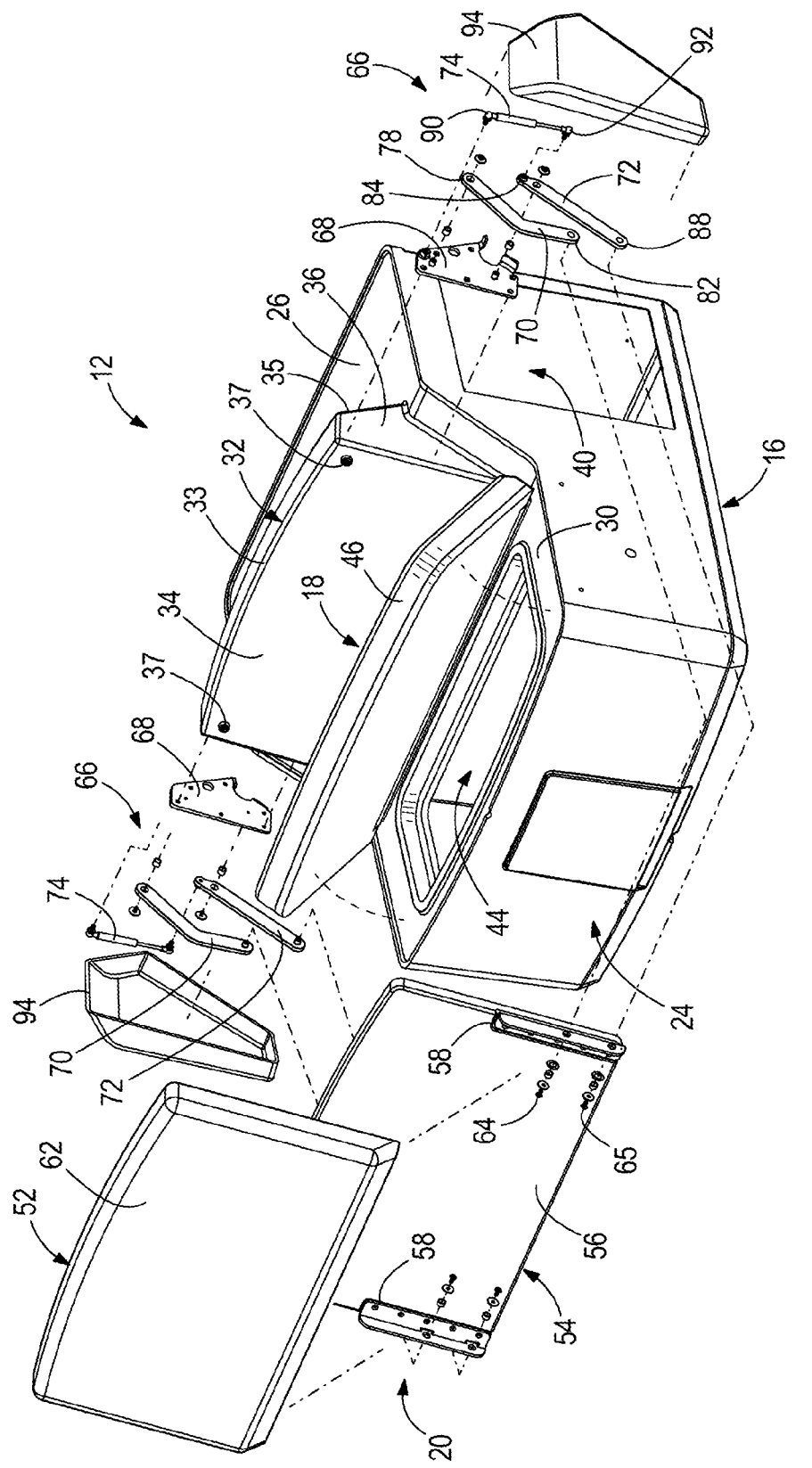
FIG. 3 is an exploded view of various elements of the convertible seating system shown in FIG. 1.
Figure 4:
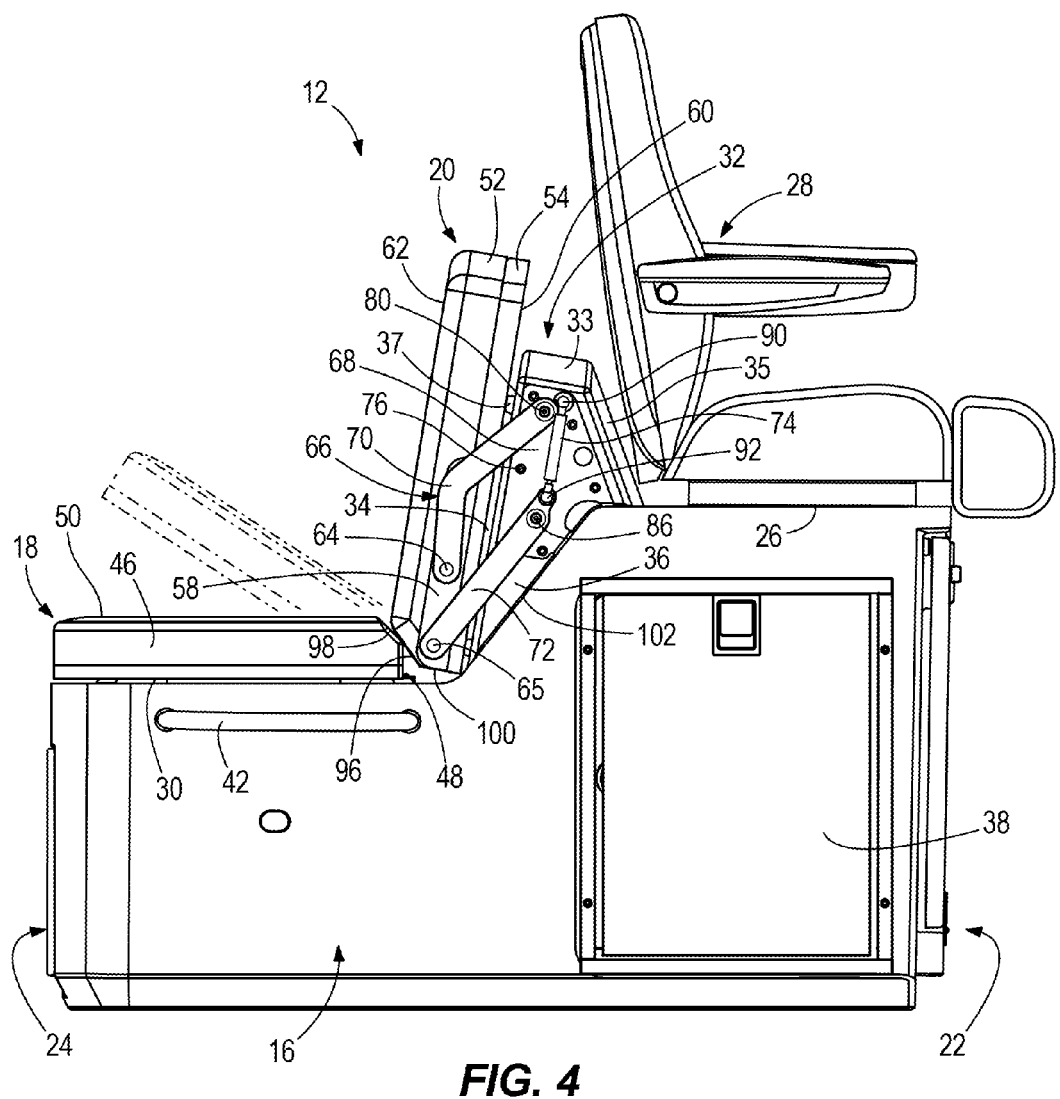
FIG. 4 is a partial elevational view of the convertible seating system shown in FIG. 2 illustrating a backrest in a first position.

Referring to FIGS. 2-4, the base 16 is formed as a box-like structure having a front end 22 and a back end 24. The front end 22 has a forward planar surface 26 for mounting a pair of forward-facing seats 28, and the back end 24 has a rearward planar surface 30 for mounting the seat 18 at an elevation lower than that of the forward-facing seats 28. The base 16 includes a raised support structure 32 located between the front end 22 and the back end 24 and rising above the forward planar surface 26 and the rearward planar surface 30 for mounting the backrest 20. The raised support structure 32 has a top wall 33, a downwardly sloping rear wall 34, a forwardly sloping front wall 35 and a pair of opposed side walls (one being seen at 36). A set of stops 37 is provided at the corners of the rear wall 34. Opposite sides of the base 16 may include at least one door 38 for enabling access to a storage chamber 40, and at least one grab rail 42 which provides gripping surfaces for boaters using the seating system 12. As seen in FIG. 3, the base 16 is configured with a storage compartment 44 formed beneath the seat 18.

The seat 18 includes a cushion 46 having a first edge which is pivotally attached by a hinge 48 to the rearward planar surface 30 of the base 16. The hinge 48 enables the cushion 46 to be pivoted upwardly (as shown in phantom lines of FIG. 4) so as to provide access to the storage compartment 44. The cushion 46 has an upper surface 50 which defines a planar seating surface. In the example shown, the seat 18 is configured as a couch for accommodating more than one seat occupant. The particular size and shape of the seat 18 is not limited, however, to the embodiment shown in the drawings.

As best seen in FIGS. 3 and 4, the backrest 20 includes a cushion 52, and a rigid backing panel 54. The backing panel 54 has a mounting face 56 provided with a pair of elongated U-shaped channel brackets 58, and an opposed planar face 60 defining a work surface as will be better understood below. The cushion 52 has a back-engaging surface 62, and an opposed attachment surface with a mounting bracket structure (not shown) which is received and retained in the channel brackets 58, such as by fasteners 64, 65 so that the cushion 52 is rigidly secured to the backing panel 54.

The backrest 20 is adjustably connected by a backrest transfer arrangement defined by a pair of transfer assemblies 66 mounted to the opposed side walls 36 of the raised support structure 32 of the base 16. The backrest 20 is configured for movement relative to the base 16 and the seat 18 between a raised back-engaging position (FIGS. 2 and 4) located adjacent the rear wall 34 of the raised support structure 32, and a horizontal working position (FIGS. 7 and 8) defining a work surface spaced above the seat 18. As seen in the back-engaging raised position of FIG. 4, the plane of the back-engaging surface 62 extends at a slight angle forwardly relative to the plane of the upper surface 50 of the seat 18. Other orientations of the raised back-engaging position are contemplated by the present disclosure.

Referring to FIGS. 3-7, each of the transfer assemblies 66 is identical, and includes a mounting plate 68, a bent link 70, a straight link 72 and a motion assistance device in the exemplary form of an extendable and retractable gas strut 74.

Each mounting plate 68 is fixed to one of the opposed side walls 36 of the raised support structure 32 on base 16 by a set of fasteners 76. One end 78 of the bent link 70 is pivotally secured at a pivot 80 to the mounting plate 68. An opposite end of the bent link 70 is swingably coupled by one of the fasteners 64 to one of the channel brackets 58 fixed on the backing panel 54. One end 84 of the straight link 72 is pivotally joined at a pivot 86 to the mounting plate 68. An opposite end 88 of the straight link 72 is mounted for turning by one of the fasteners 65 on the channel bracket 58. The fasteners 64, 65 define pivot axes which are configured to be movable relative to the base 16 and the seat 18. The pivots 80, 86 define pivot axes which are stationary relative to the base 16 and the seat 18. A base end 90 of the gas strut 74 is pivotally mounted to the mounting plate 68, and a rod end 92 of the gas strut 74 is swingably attached to the one end of the straight link 72. A removable side cover 94 is provided for each of the transfer assemblies 66.

In certain embodiments depicted in FIGS. 2 and 4, the backrest 20 is adjusted to provide the seating system 12 with a seating configuration facing in a direction opposite the forward-facing seats 28 to define an aft-facing couch seat. In the aft-facing seat, the backrest 20 is normally placed in the raised back-engaging position to provide proper body support for the seat occupants.

Figure 7:
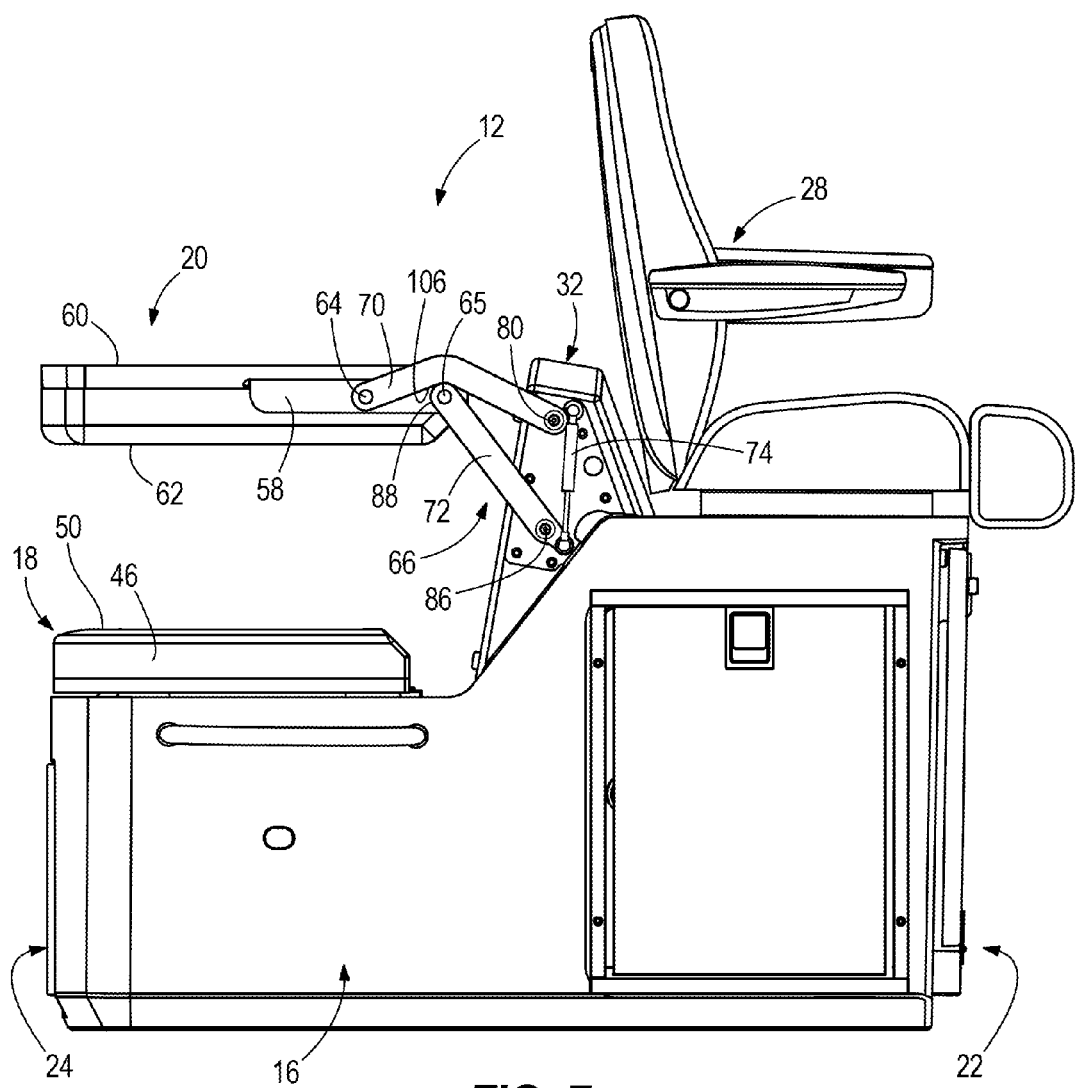
FIG. 7 is an elevational view similar to FIGS. 4-6 illustrating the backrest in the second position providing the flip-out work surface.
Figure 8:
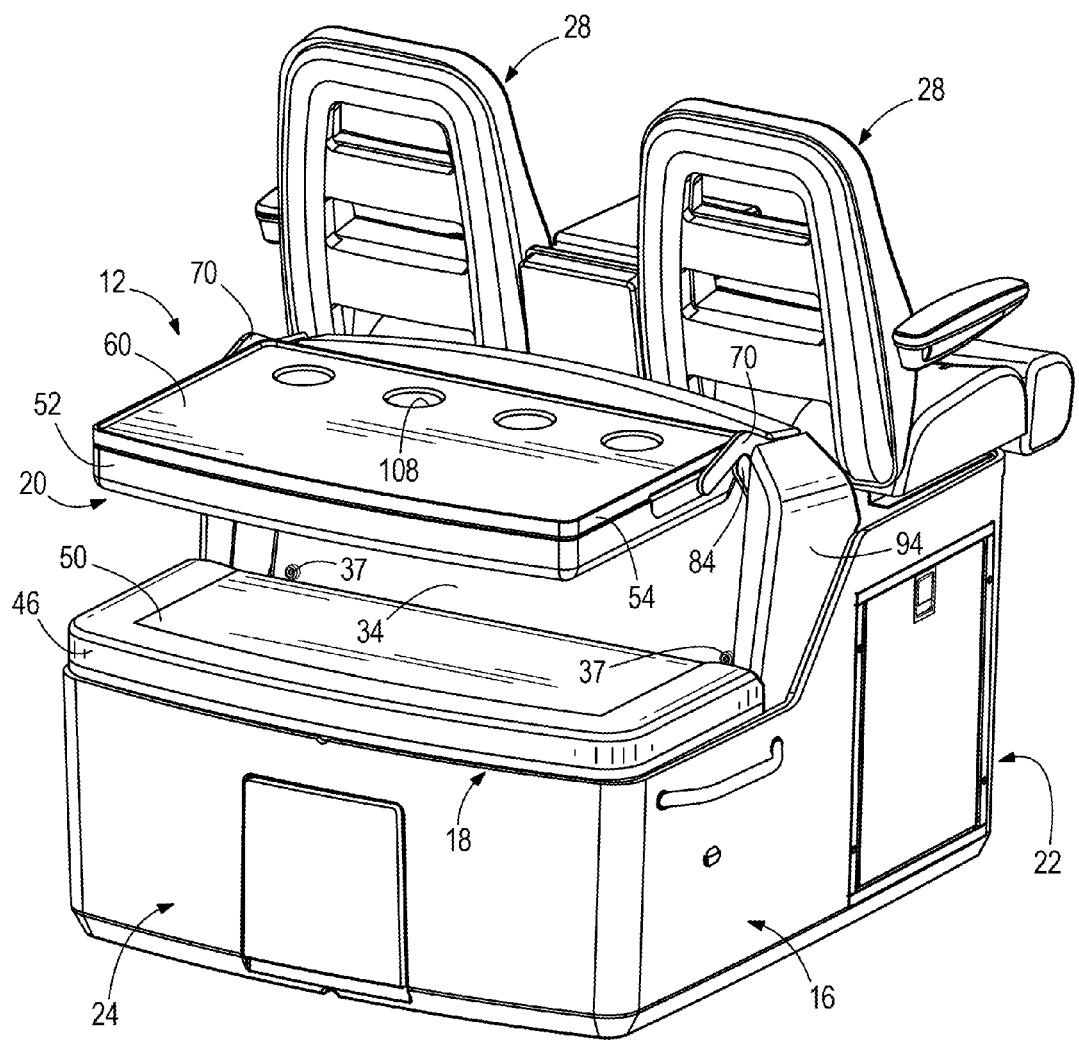
FIG. 8 is a rear perspective view of the convertible seating system of FIG. 7.

In accordance with the present disclosure, the seating system 12 can be converted and the backrest 20 can be adjusted to the horizontal working position spaced above the seat 18 to provide the planar face 60 as a work surface that is parallel to the seating surface 50 as depicted in FIGS. 7 and 8. More specifically, the backrest 20 can be moved rearwardly of the base 16 and the seat 18 through the use of the backrest transfer arrangement formed by the pair of transfer assemblies 66 connecting the channel brackets 58 on opposite sides of the backrest 20 to the opposed side walls 36 of the raised support structure 32 on the base 16. Each of the transfer assemblies 66 include a pivot linkage arrangement defined by the bent link 70 and the straight link 72 which cooperate with the gas strut 74 to shift the backrest 20 between the raised position and the horizontal working position thereof.

With reference to FIG. 4, the backrest 20 is normally held in the raised position with the planar face 60 of backrest 20 engaged against the stops 37 on the rear wall 34 of the raised support structure 32. Planar face 60 thus lies adjacent to and parallel to the rear wall 34 of the raised support structure 32. An inner beveled edge 96 on the back-engaging surface 62 is frictionally engaged with an inner beveled edge 98 provided on the seat 18 so that an inner end 100 of the backrest 20 is retained between the seat 18 and an upper inclined surface 102 of the base 16.

Figure 5:
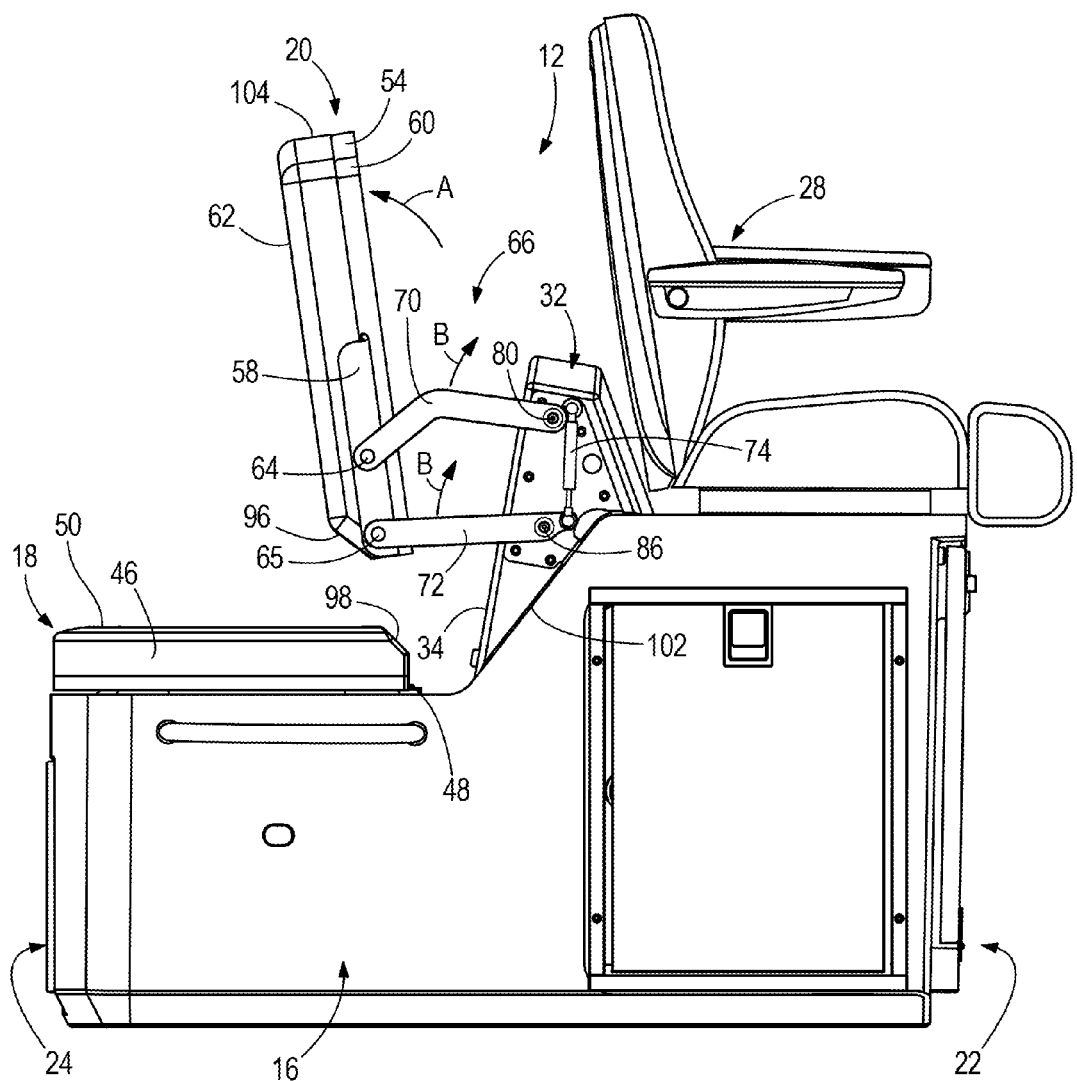
FIGS. 5 and 6 are elevational views similar to FIG. 4 illustrating the backrest being moved towards a second position.

Referring to FIG. 5, when it is desired to move the backrest 20 towards the horizontal working position, a user having vacated the seat 18 grasps and moves an outer end 104 of the backrest 20 upwardly and rearwardly in the direction of arrow A, causing the bent links 70 and the straight links 72 to move in the direction of arrows B. At the same time, the motion assistance devices in the form of the gas struts 74 are configured to provide assistance in moving the backrest 20. Other suitable motion assistance devices, such as gas springs or electric, hydraulic or pneumatic actuators, are further contemplated by the present disclosure. The backrest 20 is progressively moved manually to the position shown in FIG. 6 as enabled by the pivoting bent links 70 and the pivoting straight links 72 as well as the gas struts 74.

Figure 6:
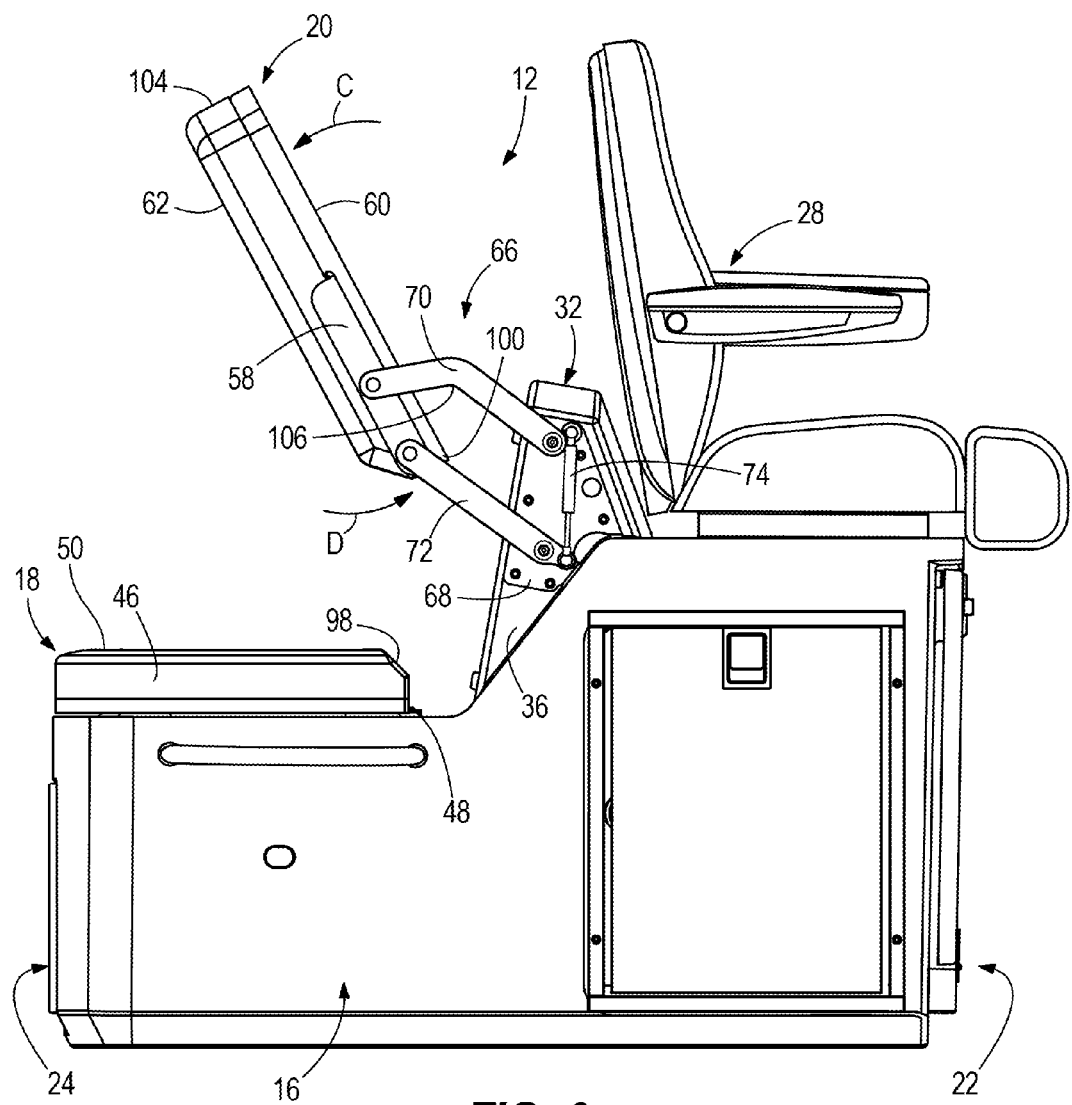

Once the backrest 20 has reached the position shown in FIG. 6, the user applies a downward and rearward force on the outer end 104 of the backrest 20 in the direction of arrow C to flip the backrest 20 about its inner end 100 in the direction of arrow D to the horizontal working position shown in FIG. 7. During this motion, the pivoting linkage arrangement is configured such that end 88 of each straight link 72 is received and held engaged against a retainer surface 106 defined by the bend of each of the bent links 70 so that the backrest 20 is adequately supported when flipped. In the horizontal working position, the planar face 60 defines a work surface which is vertically displaced above and lies generally parallel to the seating surface 50. As seen in FIG. 8, the planar face 60 can be provided with recessed areas 108 for holding items such as containers. When it is desired to return the backrest 20 to the raised position shown in FIGS. 2 and 4, the user reverses the procedure set forth above.

It should be understood from the above description that the transfer assemblies 66 rely on assisted movement of the bent links 70 and the straight links 72 and a moving pivot axis configuration defined by the moving pivoting fasteners 64, 65 which move relative to the base 16 and the seat 18, and enable transfer of the backrest 20 between the raised position shown in FIGS. 2 and 4 and the horizontal working position shown in FIGS. 7 and 8.

The convertible seating system 12 thus conveniently provides boaters with flexible options including seats for multiple occupants and a flip-out work station in one package.

In the present disclosure, certain terms have been used for brevity, clearness and understanding. No unnecessary limitation are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A seating system comprising:
    a base;
    a seat mounted on the base, and defining a seating surface; and
    a backrest configured for movement relative to the base and the seat between a first position and a second position by a backrest transfer arrangement having a movable pivot axis configuration,
    wherein, in the second position, the backrest defines a working surface spaced above and lying generally parallel to the seating surface;
    wherein the pivot axis configuration is defined by a pivoting linkage arrangement;
    wherein the pivoting linkage arrangement includes at least one bent link and at least one straight link;
    wherein the bent link and the straight link are spaced from each other when the backrest is in the first position;
    wherein the bent link engages with the straight link to support the backrest in the second position.

2. The seating system of claim 1, wherein the backrest transfer arrangement includes at least one motion assistance device for assisting movement of the backrest between the first position and the second position.

3. A seating system comprising:
    a seat defining a seating surface;
    a base mounting the seat thereon and having a raised support surface extending above the seat; and
    a backrest mounted to the raised support structure on the base for movement relative to the seat between a raised position and a horizontal position extending above the seat and defining a work surface lying parallel to the seating surface,
    wherein the backrest is adjustably connected to the raised support structure by a backrest transfer arrangement including a pair of transfer assemblies mounted between opposed side members of the backrest and opposed side walls of the raised support structure, each of the transfer assemblies being provided with a movable pivot axis configuration;
    wherein each of the transfer assemblies includes a pivoting linkage arrangement and a motion assistance device;
    wherein the pivoting linkage arrangement includes a pair of links, each having one end pivotally connected to one of the opposed side members of the backrest at a fixed pivot, and an opposite end pivotally joined to one of the side walls of the raised support surface at another fixed pivot.

4. The seating system of claim 3, wherein the pair of links includes a bent link and a straight link.

5. The seating system of claim 4, wherein the bent link and the straight link are engaged with each other when the backrest is in the horizontal position.

6. The seating system of claim 4, wherein the motion assistance device has one end pivotally attached to the one of the side wells of the raised support surface, and an opposite end pivotally coupled to the straight link.

7. A seating system comprising:
    a base having a front end, a rear end and opposed side members;
    a seat mounted on the base and defining a seating surface; and
    a backrest movably attached to the base by a pair of transfer assemblies enabling movement of the backrest between a raised position and a horizontal position,
    wherein, in the horizontal position, the backrest defines a working surface which is spaced above and lies generally parallel to the seating surface,
    wherein each of the transfer assemblies include a mounting plate fixed to one of the side members of the base, a bent link having one end pivotally connected about a first pivot axis to a side portion of the backrest, and an opposite end pivotally secured about a second pivot axis to the mounting plate, and a straight link having one end pivotally connected about a third pivot axis to the side portion of the backrest, and an opposite end pivotally secured about a fourth pivot axis to the mounting plate,
    wherein the first pivot axis and the second axis remain stationary and immovable with respect to the backrest and are movable relative to the base and the seat.

8. The seating system of claim 7, wherein the third pivot axis and the fourth pivot axis are stationary and immovable relative to the base and the seat.

9. The seating system of claim 7, wherein each of the transfer assemblies also includes a motion assistance device having one end pivotally connected to the mounting plate, and an opposite end pivotally secured to the one end of the straight link.

10. The seating system of claim 9, wherein the motion assistance device is an extendable and retractable gas strut.

11. The seating system of claim 7, wherein the backrest is held in the horizontal position by engagement of the one end of the straight link with a retainer surface formed in the bent link.

12. The seating system of claim 7, wherein, with the backrest in the raised position, the seating system defines an aft-facing seat at the rear end of the base, and the front end of the base includes at least one forward-facing seat.

13. A seating system for a marine vessel, the seating system comprising:
  a seat that defines a seating surface;
  a base that supports the seat and has a raised support structure that extends transversely relative to the seating surface;
  a backrest having opposing sides including a back-engaging surface and a work surface that is opposite the back-engaging surface; and
  a backrest transfer arrangement that couples the backrest to the base so that the backrest is movable relative to the base and the seat into and between a back-engaging position and a working position,
  wherein in the back engaging position the backrest is positioned so that the work surface faces the raised support structure and the back-engaging surface extends transversely relative to the seating surface, and wherein in the working position the backrest is positioned so that the back-engaging surface faces the seat and the work surface extends transversely with respect to the raised support structure,
  wherein the backrest transfer arrangement comprises a pair of transfer assemblies mounted on opposed sidewalls of the raised support structure, and
  wherein each of the pair of transfer assemblies comprises first and second links, each of the first and second links having an end that is pivotably secured to the backrest at a pivot axis that remains fixed with respect to the backrest and an opposite end that is pivotably secured to the base at a pivot axis that remains fixed with respect to the base.

14. The seating system according to claim 13, wherein the pivot axis that remains fixed with respect to the backrest is moved with respect to the base when the backrest is moved into and out of the back-engaging position and working position.

15. The seating system according to claim 14, wherein the first link is bent, and wherein in the working position the first link rests on top of the end of the second link that is pivotably secured to the backrest so as to support the backrest.

16. The seating system according to claim 15, wherein in the back engaging position the pivot axis of the second link that remains fixed with respect to the backrest is vertically lower than the pivot axis of the second link that remains fixed with respect to the base.

17. The seating system according to claim 16, wherein the working position that pivot axis of the second link that remains fixed with respect to the backrest is vertically higher than the pivot axis of the second link that remains fixed with respect to the base.

18. The seating system according to claim 16, wherein the backrest transfer arrangement further comprises a gas strut that assists movement of the backrest.

* * * * *